United States Patent
Goehlich

(10) Patent No.: US 10,214,275 B2
(45) Date of Patent: Feb. 26, 2019

(54) METHOD OF INSTALLING A FIXTURE

(71) Applicant: Airbus Operations GmbH, Hamburg (DE)

(72) Inventor: Robert Alexander Goehlich, Hamburg (DE)

(73) Assignee: Airbus Operations GmbH (DE)

(*) Notice: Subject to any disclaimer, the term of this patent is extended or adjusted under 35 U.S.C. 154(b) by 935 days.

(21) Appl. No.: 14/299,097

(22) Filed: Jun. 9, 2014

(65) Prior Publication Data

US 2014/0367519 A1 Dec. 18, 2014

(30) Foreign Application Priority Data

Jun. 13, 2013 (EP) .................................... 13171838

(51) Int. Cl.
*B29C 67/00* (2017.01)
*B64C 1/00* (2006.01)
(Continued)

(52) U.S. Cl.
CPC .............. *B64C 1/00* (2013.01); *B22F 5/00* (2013.01); *B22F 7/062* (2013.01); *B29C 64/106* (2017.08); *B64F 5/10* (2017.01); *F16M 13/02* (2013.01)

(58) Field of Classification Search
CPC ..... B64C 1/00; B64C 2001/0054; B64F 5/10; B29C 67/0051; B29C 67/0055; B22F 7/062; B22F 5/00; B22F 2007/042; F16M 13/02; B25J 9/0084; B25J 9/08; B33Y 10/00; B33Y 80/00
See application file for complete search history.

(56) References Cited

U.S. PATENT DOCUMENTS

| 4,951,894 A | 8/1990 | Young, Jr. et al. |
| 5,010,634 A * | 4/1991 | Uemura ................. B62D 65/02 29/407.04 |

(Continued)

FOREIGN PATENT DOCUMENTS

| EP | 2 221 151 A2 | 8/2010 |
| RU | 2438939 C2 | 1/2012 |

(Continued)

OTHER PUBLICATIONS

Russian Decision to Grant (dated Jul. 21, 2015).
European Search Report (dated Nov. 21, 2013) (EP 13 171 838.9).

*Primary Examiner* — Jun S Yoo
(74) *Attorney, Agent, or Firm* — Lerner, David, Littenberg, Krumholz & Mentlik, LLP

(57) ABSTRACT

A method of installing a fixture, such as a bracket, in a fuselage structure of an aircraft includes the steps of: providing or generating a three-dimensional digital model of the fixture; arranging a head of an additive manufacturing apparatus in the fuselage structure; and forming the fixture in situ in the fuselage structure with the head of the additive manufacturing apparatus based upon the digital model of the fixture. The fixture is installed in the fuselage structure by bonding or fusing the fixture to the fuselage structure as the fixture is formed. A fixture, such as a bracket, which is generated in situ in a fuselage structure of an aircraft based upon a three-dimensional digital model, wherein the fixture is bonded or fused to the fuselage structure as the fixture is formed.

10 Claims, 3 Drawing Sheets

(51) Int. Cl.
*B22F 5/00* (2006.01)
*B22F 7/06* (2006.01)
*F16M 13/02* (2006.01)
*B64F 5/10* (2017.01)
*B29C 64/106* (2017.01)

(56) References Cited

U.S. PATENT DOCUMENTS

| | | | | |
|---|---|---|---|---|
| 5,745,834 | A * | 4/1998 | Bampton | B22F 3/10 |
| | | | | 419/37 |
| 6,269,540 | B1 * | 8/2001 | Islam | B23K 26/0604 |
| | | | | 29/402.18 |
| 8,178,033 | B2 * | 5/2012 | Dietrich | B29C 33/3842 |
| | | | | 264/219 |
| 8,260,447 | B2 | 9/2012 | Mattes et al. | |
| 2008/0243455 | A1 | 10/2008 | Wood | |
| 2011/0156304 | A1 * | 6/2011 | Walker | B23P 15/24 |
| | | | | 264/219 |
| 2011/0240200 | A1 | 10/2011 | Korya et al. | |

FOREIGN PATENT DOCUMENTS

| | | |
|---|---|---|
| RU | 2477219 C2 | 3/2013 |
| WO | 2009/044362 A2 | 4/2009 |

\* cited by examiner

METHOD OF INSTALLING A FIXTURE

TECHNICAL FIELD

The present invention relates to a method of installing a fixture, such as a bracket, on a body structure of a vehicle, particularly a body or fuselage structure of an aircraft or spacecraft, for mounting or attaching items or systems with respect to that structure. The invention also relates to a fixture, such as a bracket, installed in or on a vehicle, especially an aircraft or spacecraft, and thus to the vehicle itself incorporating such a fixture. It will be noted that the term "spacecraft" as used herein includes satellites and space-station modules, as well as rocket modules or parts.

BACKGROUND OF THE INVENTION

The installation of items and/or systems, such as electrical systems with conduits and cables, in nautical, aeronautical or automotive applications typically involves the use of mounting fixtures or brackets which need to be secured to a structure (e.g. a vehicle chassis or hull structure) for then supporting those systems. Conventionally, these fixtures are secured to the structure via fasteners, such as rivets, clips or screws, or via an adhesive.

Some disadvantages of mechanical fasteners, like rivets and screws, include that the fixture or bracket requires bores for the fasteners, that the fixture needs to be positioned with respect to the bores, and that it requires a fastening operation to then secure the fasteners. Depending on the particular application, the fixture or bracket may also then need to be sealed around the fasteners and bores. These steps naturally involve process costs. Some disadvantages of adhesive attachment include that both the fixture or bracket and the attachment surface may require pre-treatment, such as roughening and/or degreasing, and that an adhesive application operation is needed, then followed by operations to position and mount the fixture or bracket under application of pressure. These steps again involve process costs.

BRIEF SUMMARY OF THE INVENTION

It is therefore one idea of the present invention to provide a new and improved method or technique for overcoming one or more of the problems discussed above. In particular, it would be useful to provide a new method of installing a fixture or bracket in a fuselage structure of an aircraft or spacecraft, with which a faster and/or an automated procedure may be facilitated.

According to one aspect, therefore, the invention provides a method of installing a fixture, such as a bracket, on a body structure of a vehicle, especially a fuselage structure of an aircraft or spacecraft, comprising:

providing or creating a three-dimensional digital model of the fixture;

arranging a head of an additive manufacturing apparatus in or on or adjacent the fuselage structure; and forming the fixture in situ on the fuselage structure with or via the head of the additive manufacturing apparatus based upon the digital model of the fixture;

the fixture being installed on the fuselage structure by connecting the fixture (e.g. mechanically, or via bonding or fusing) to the fuselage structure as the fixture is formed.

In this way, the installation of the fixture may essentially occur automatically with the formation of the fixture itself. Thus, the method provides maximum flexibility in the fuselage assembly procedure and does not require separate or external manufacture of individual fixtures or brackets. There is also no need for any inventory of spare parts, as the fixtures are created directly from the digital model during installation. Similarly, there is no need for non-flying parts, e.g. which may be required to fix a bracket on the structure during a curing process but which are then later removed. Accordingly, the design of the fixtures can encompass a full range of variants and can be adapted or modified readily as the design parameters change.

In one embodiment, the step of forming the fixture in situ in the fuselage structure comprises building the fixture by sequentially generating and/or building up layers of the fixture via the head of the additive manufacturing apparatus. In this regard, the layers of the fixture may be sequentially deposited on the fuselage structure, such that the fixture is able to be built up from these layers to its final three-dimensional form based on the digital model. Accordingly, in a preferred embodiment, the step of connecting the fixture to the structure comprises that one or more of the layers of the fixture may be bonded or fused to the fuselage structure as it or they are generated and/or deposited on the vehicle structure. Alternatively, or in addition, the one or more layers of the fixture may be bonded or fused to the fuselage structure in a curing step that follows after they have been generated and/or deposited on the vehicle structure. In another preferred embodiment, however, the step of connecting the fixture to the structure may include forming the fixture in a mechanical fit or a mechanical engagement or connection with part of the structure. Indeed, the step of connecting the fixture to the structure may comprise a combination of bonding or fusing, together with a mechanical engagement or connection.

In a further embodiment, the method is designed or adapted for use with a structure comprised of a composite material, especially of a fibre-reinforced polymer composite, such as a glass fibre-reinforced polymer (GFRP) composite or a carbon fibre-reinforced polymer (CFRP) composite. Thus, the additive manufacturing apparatus may be configured to generate or form the fixture from a material that is adapted to fuse or bond with a fibre-reinforced polymer in the structure. It will be appreciated, however, that the method may also be carried out with a body structure comprised of a metal, as is typical in conventional airframes and fuselage structures, such that the additive manufacturing apparatus is configured to generate or form the fixture from a material that can fuse or bond with the metallic structure. In addition to the fused or bonded connection that arises via this method, the fixture may also be secured with supplementary mechanical fasteners, such as rivets, screws, bolts or the like; such additional fasteners can be used to augment a connection of the fixture to the vehicle structure.

In a further embodiment, forming or building the fixture with the additive manufacturing apparatus comprises any one or more of: fused deposition modelling (FDM), laser sintering (LS), selective heat sintering (SHS), and stereo-lithography (SLA). These techniques may be generally referred to as three-dimensional (3D) printing. In the case of stereo-lithography (SLA), the fixture will then typically be formed from a photo-polymer material, such as a UV-curable or UV-sensitive polymer. In the case of a fused deposition modelling (FDM) procedure, the fixture may be formed from a curable polymer or thermoplastic polymer, such as acrylonitrile butadiene styrene (ABS) or a high-density poly-ethylene (HDPE), or from a metal, like a eutectic metal. In the case of selective heat sintering (SHS) or laser sintering (LS), the fixture may be formed from near any metal alloy, which is typically provided in a powdered or granular form, but also from a range of polymers that may also be in a powdered or granular form. Examples of polymers that would be suitable for series production of fixtures with a method of the present invention include DSM Somos® products Nanolool™, NanoForm™, and Protolherm™. These polymers are UV-curable, such that they may be hardened by irradiation with UV-light after their deposition in a final shape of the fixture. In this regard, these DSM Somos® polymers typically have a bending stiffness in the range of 79 to 121 N/mm$^2$ and tension stiffness in the range of 62 to 78 N/mm$^2$ after UV-hardening.

In a further embodiment, the three-dimensional digital model of the fixture includes data on a specific or desired position of the fixture within or on structure. Thus, forming the fixture in situ may include positioning the head of the additive manufacturing apparatus within or on the structure based upon the data concerning the specific or desired position in the digital model. To this end, the body or fuselage structure may include one or more reference markers for providing a spatial correlation to reference points in the digital model of the fixture. One or more sensors may be provided for detecting and identifying the reference markers and then positioning the head of the additive manufacturing apparatus based upon the detected and identified reference markers.

The positioning and movement of the additive manufacturing apparatus may be computer-controlled. For example, the additive manufacturing apparatus or the head thereof may be provided on a robotic assembly or a robotic arm, which is controllable to move and position the head of the apparatus based upon the 3D digital model of the fixture. In this way, a very precise positioning of a fixture or bracket in or on the body structure can be achieved, and with a high level of repeatability.

Although the method of the invention has been described above with specific reference to a vehicle, such as an aircraft or spacecraft, it will be appreciated by persons skilled in the art that the invention is also applicable to non-vehicular structures. For example, the invention also provides a method of installing a fixture, such as a bracket, on a stationary structure, such as a mast or tower for a wind turbine or for an antenna (e.g. communication or TV antenna), a building, or other such structure. Furthermore, although the fixture may be installed with the inventive method during fabrication of the structure itself, it may also be subsequently installed in situ, e.g. via a climbing or crawling robot assembly in the case of a mast, tower, building, or space-station.

Thus, according to a further aspect, the invention provides a method of installing a fixture, such as a bracket, on a body or structure, comprising:

providing or creating a three-dimensional digital model of the fixture;
  arranging a head of an additive manufacturing apparatus on or adjacent the structure; and
  forming the fixture in situ on the structure with or via the head of the additive manufacturing apparatus based upon the digital model of the fixture;
  wherein the fixture is installed on the structure by connecting it to the structure as the fixture is formed.

By employing the above method in space via a robot assembly that incorporates the additive manufacturing apparatus or 3D printer, e.g. to carry out a repair or an installation job on a hull or outside of an orbiting space-station, an astronaut can be spared the necessity of a space-walk and associated risk. In other words, the fixture may be installed with the inventive method via a robot, which may operate unimpeded and substantially without risk in the environment of space. Thus, a movable robotic device, such as a climbing or crawling robot, can be used to perform the method of the invention.

In an embodiment, the digital model for the fixture may be created and/or modified during the installation procedure. Where the method is being carried out, for example, to conduct a repair of part of the structure, it may first be necessary to inspect and/or assess the part to be repaired before the precise shape and/or size of the fixture required can be ascertained. To this end, the method of the invention may include examining a part of the structure to assess and/or determine the geometry and/or the dimensions of the fixture required, then providing or creating the three-dimensional (3D) digital model of the fixture based on the results of that examination. The robot assembly may therefore include examination equipment, such as a camera and/or one or more sensors to inspect and/or examine the part of the structure of interest.

An extension of the above concept includes the possibility of the additive manufacturing apparatus or 3D printer, e.g. set or provided on a robot, also generating or forming structural fixtures or elements for installation on the structure (e.g. on a hull of a space-station). Such fixtures or elements may also be provided in the form of tracks or rails, which may then influence or determine the movement or progress of the robot itself. These elements can, for example, be designed to chart or define a path of the robot to a specific location at which a repair may need to be undertaken.

According to another aspect, the present invention provides a fixture, such as a bracket, which is generated in situ in or on a structure, especially a vehicle body structure such as an airframe or fuselage of an aircraft or spacecraft, based on a three-dimensional digital model, wherein the fixture is connected to that structure as the fixture is formed. As noted above, the fixture may bonded or fused to the structure as the fixture is formed, although alternatively it may be mechanically connected. It should be appreciated that a "fixture" in the context of the present invention is not limited to a bracket or similar such mounting elements, but may also encompass a lining panel or a shell of cabin or an interior cladding component of the structure or vehicle.

In an embodiment, the fixture comprises sequentially generated or deposited layers which are bonded or fused to the body or fuselage structure. As noted above, the fixture may be formed from a polymer material, such as a UV-curable polymer, or a thermoplastic polymer, such as acrylonitrile butadiene styrene (ABS) or high density polyethylene (HDPE), or from a metal, such as a eutectic metal, including from one or more metal powders. Furthermore, in a particularly preferred form of the invention, a position of the fixture in the fuselage structure is based upon the digital model.

According to a further aspect, the present invention provides a vehicle, such as an aircraft or spacecraft, having a body or fuselage structure incorporating at least one fixture, and preferably several, according to any one of the embodiments described above. In this regard, the vehicle of the invention may be any of various known transportation means, including but not limited to a train, car, truck, bus, ship, boat, air-ship, helicopter, and/or space vehicle. The body structure of the vehicle may thus be a chassis or frame of the vehicle.

BRIEF DESCRIPTION OF THE DRAWINGS

For a more complete understanding of the present invention and the advantages thereof, exemplary embodiments of the invention are explained in more detail in the following description with reference to the accompanying drawings, in which like reference characters designate like parts and in which.

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

DETAILED DESCRIPTION

Figure 1:
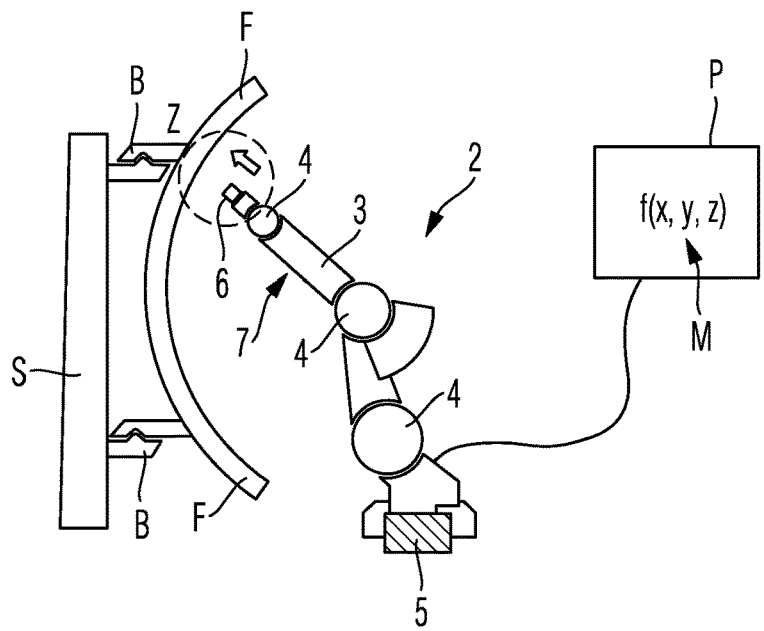
FIG. 1 is a schematic side view of a section of a fuselage or hull structure of an aircraft, upon which a fixture or bracket is being installed according to an embodiment of the invention.

With reference firstly to FIG. 1 of the drawings, a system for installing a fixture 1 (here in the form of a bracket) in an airframe or fuselage structure F of an aircraft according to a method of the invention is illustrated schematically. The airframe or fuselage structure F of the aircraft in this embodiment comprises a curved shell section of the fuselage, comprised of a carbon-fibre reinforced polymer composite, which is supported in this case by brace elements B extending horizontally from a vertically extending supporting framework S. Also shown in FIG. 1 is a robot assembly 2, which includes a robotic arm 3 having a plurality of articulated joints 4, each of which is drivable in at least one and preferably in a number of degrees-of-freedom. The robot assembly 2 is itself mounted for translational movement along a rail member 5 in a direction perpendicular to a plane of drawing FIG. 1.

Mounted on a distal end region of the robot arm 3 is a head 6 of an additive manufacturing apparatus 7, which is generally understood or may be referred to as a 3D printer device. This additive manufacturing apparatus 7 may operate on any one of the known 3D printing techniques, such as fused deposition modelling (FDM), laser sintering (LS), or stereo-lithography (SLA). Particularly preferred in this embodiment is a fused deposition modelling (FDM) apparatus 7. The movement of the robotic assembly 2, and more particularly of the robot arm 3 via the articulated joints 4 and its position along the rail member 5, are computer-controlled via a computer processor P (illustrated schematically here, and shown later in FIG. 3), which also controls operation of the additive manufacturing apparatus 7. To commence the installation of a new fixture or bracket 1 according to the inventive method, the head 6 of the apparatus 7 is moved by the robot arm 3 in the direction of the arrow in FIG. 1 to a predetermined position Z on the fuselage shell F.

Referring now also to FIGS. 2(a) to 2(d) of the drawings, forming or building the fixture or bracket 1 in the fuselage structure F is illustrated in the series of four images (a) to (d). In the image of FIG. 2(a), the head 6 of the FDM apparatus 7 arranged at the distal end region of the robotic arm 3 has been moved into proximity with a surface of the fuselage structure F of the aircraft at the position Z. A three-dimensional digital model M of the fixture or bracket 1 is provided or generated in the computer processor P and, based upon the data in this digital model M of the bracket 1, the computer processor P then controls the head 6 of the FDM apparatus 7 to deposit layers of polymer material onto the CFRP fuselage structure as the head 6 of the apparatus 7 is moved along the surface of shell structure F in the direction of the arrow in FIG. 2(a). Then, in FIG. 2(b), one or more layers L1 of the bracket 1 has/have been deposited upon the fuselage structure F at the predetermined position Z, which layer(s) is/are bonded or fused to CFRP structure F.

The head 6 of the FDM apparatus 7 is then moved slightly away from the fuselage structure F in the direction of the arrow shown in FIG. 2(b). As shown in FIG. 2(c), the head 6 may then commence deposition of one or more new layers L2 of the polymer material, which builds upon the previous layers L1 and thus builds-up the three-dimensional shape or form of the fixture or bracket 1. This procedure continues with reference to FIG. 2(d) of the drawings until the final 3D shape of the bracket 1 has been completed.

Figure 2:
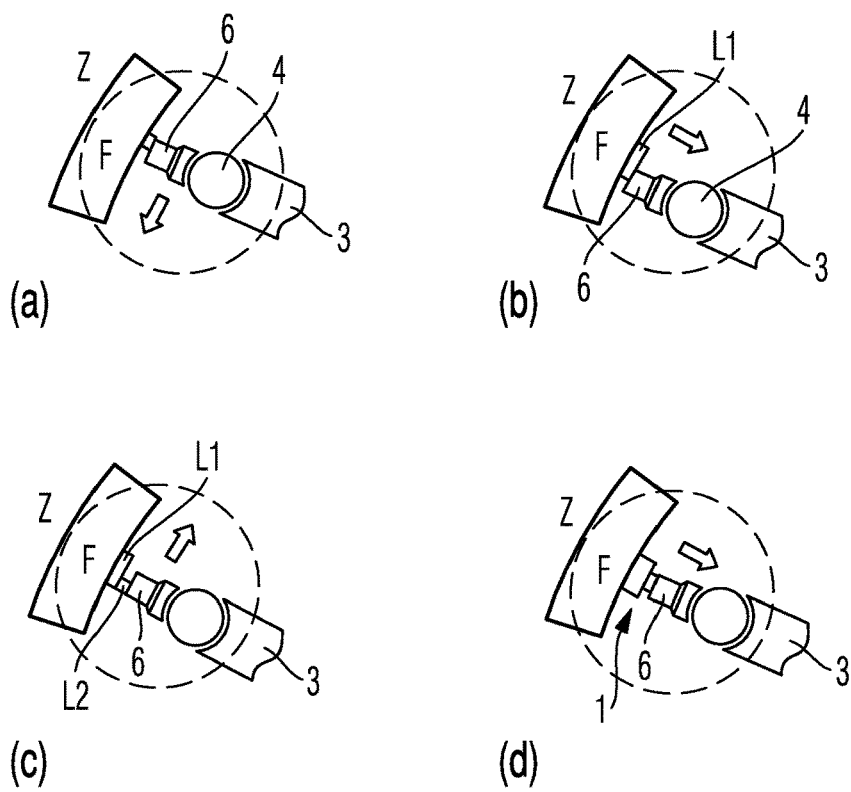
FIG. 2 shows four schematic side views (a) to (d) of the fuselage or hull structure in FIG. 1, upon which the fixture or bracket is being installed according to an embodiment of the invention.
Figure 3:
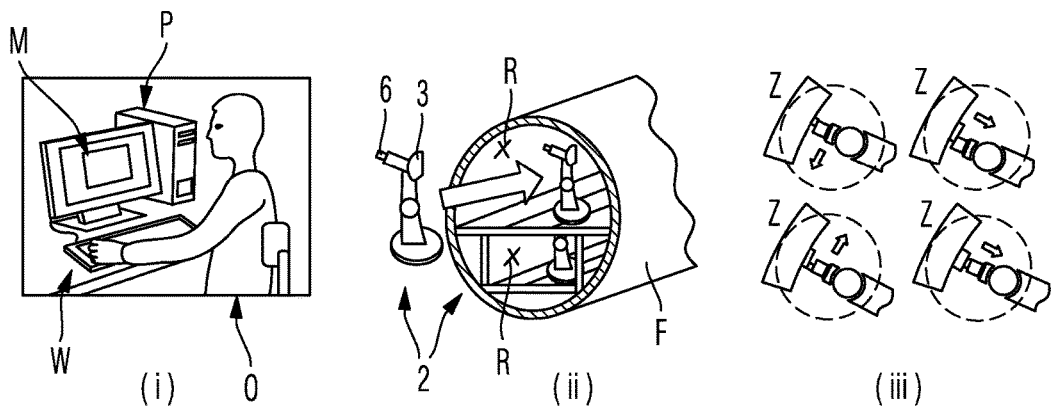
FIG. 3 schematically shows three stages (i) to (iii) of a method or technique of installing the fixture or bracket according to a particular embodiment.

With reference also now to FIG. 3 of the drawings, the method according to this preferred embodiment of the invention is illustrated in the three stages (i) to (iii). For example, in FIG. 3(i) an operator O is shown at a workstation W of the computer processor P engaged in the task of providing and/or generating the three-dimensional (3D) digital model M of the fixture or bracket 1 to be installed according to the method of this embodiment. The computer processor P at which the operator O is working is also responsible for the computer-controlled operation of the robot assembly 2 and the additive manufacturing apparatus 7 described above with respect to FIGS. 1 and 2.

FIG. 3(ii) schematically illustrates the step of positioning the robot assembly 2 with respect to the fuselage structure F upon which the bracket 1 is to be formed and installed. In this regard, the robot assembly 2 is movable on one or more rails 5 within the tubular fuselage structure F, preferably on one of a plurality of separate rails 5, e.g. at separate heights or separate floors in the fuselage F. In this regard, the fuselage structure F may be a tubular shell as seen in FIG. 3(ii), rather than just a shell section shown in FIG. 1. Also, the robot assembly 2 may include a plurality of robotic arms 3 for simultaneously operating at various different positions Z within the fuselage structure F, i.e. in order to simultaneously build and install a plurality of fixtures or brackets at different positions.

With regard to the positioning of the robot assembly 2, the digital model M of the fixture or bracket 1 may include data concerning a specific desired or predetermined position Z of a particular bracket 1 on the fuselage structure F. This data can then be used together with reference markers R provided on the fuselage structure F, which are preferably detectable and identifiable by sensors (not shown) provided on the robot assembly 2 to give spatial correlation for moving the robotic arm 3 relative to the fuselage structure F, and particularly the head 6 of the additive manufacturing apparatus 7, to the correct position Z for forming and installing that particular bracket 1 based upon the data in the digital model M.

FIG. 3(iii) essentially corresponds to FIG. 2 of the drawings and schematically illustrates the sequential deposition or layer build-up and installation of a particular bracket 1 at the desired or predetermined position Z within the fuselage structure F, with the bracket 1 being simultaneously bonded or fused to the material of the fuselage structure F.

Figure 4:
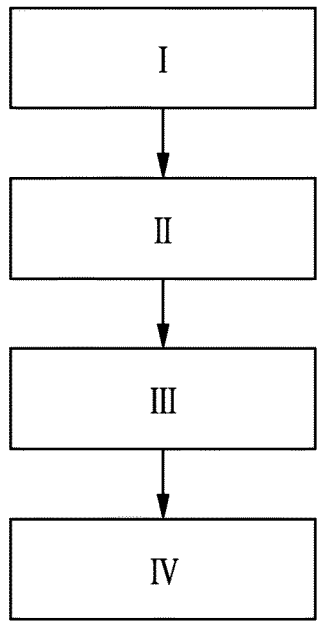
FIG. 4 is a flow diagram which schematically illustrates a method according to a further embodiment.

Referring now to FIG. 4 of the drawings, a flow diagram is shown that again schematically illustrates the steps in the method of the preferred embodiment. In this regard, the first box I of FIG. 4 represents the step of providing or the step of generating a three-dimensional (3D) digital model M of the bracket 1, which digital model M is then made available to the computer processor P that operates and controls the robot assembly 2 carrying the additive manufacturing device 7. The second box II then represents the step of moving the head 6 of the additive manufacturing apparatus 7 to a predetermined position Z in the fuselage structure F based on position data in the digital model M. The third box III represents the step of forming the bracket 1 in situ in the fuselage structure F with the head 6 of the FDM apparatus 7 by sequentially building up the bracket 1 in layers based upon the digital model M of the bracket in the computer processor P. The final box IV in drawing FIG. 4 represents the step of connecting the bracket 1 by bonding or fusing it to the CFRP fuselage structure F as the bracket 1 is formed.

Figure 5:
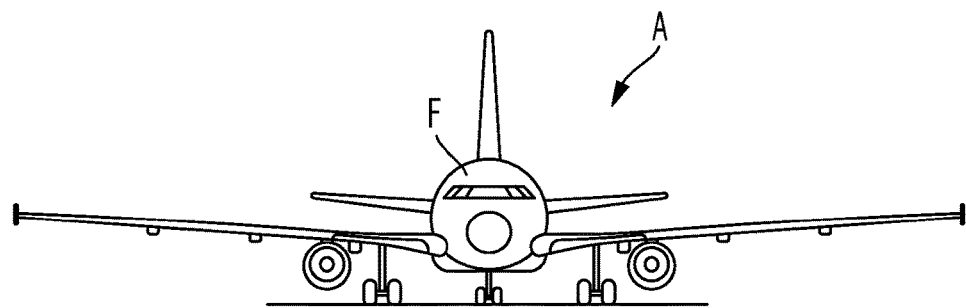
FIG. 5 is a schematic illustration of an aircraft in which one or more brackets according to an embodiment of the invention are installed.

Following the above description of the method, FIG. 5 of the drawings now schematically illustrates an aircraft A that incorporates a fuselage structure F, in which at least one fixture or bracket 1, and preferably a plurality thereof, has/have been installed according to a method of the present invention.

Figure 6:
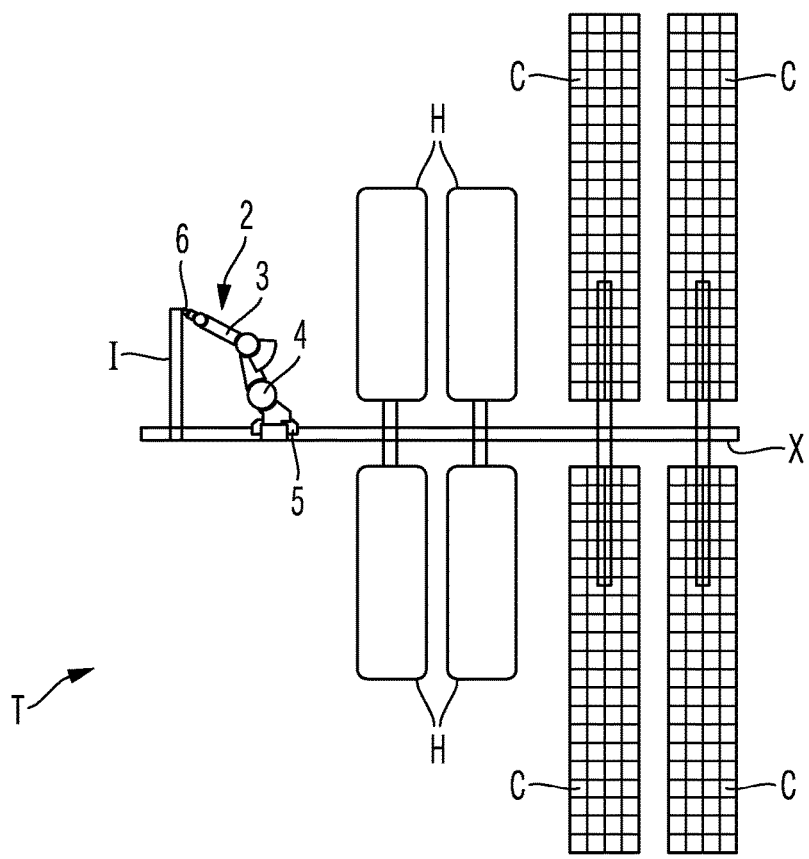
FIG. 6 is a schematic view of a space-station upon which a fixture or element is being installed according to an embodiment of the invention.

With reference to FIG. 6 of the drawings, on the other hand, an alternative embodiment is now illustrated schematically. In this embodiment, the inventive method is being carried out on a space-station T which is currently in orbit. The space-station T includes solar collector modules C, modules H for human occupation, and an antenna module I, all of which are interconnected by a structural framework X. In this example, the method is employed to conduct a repair to a part on the antenna module I. Again, a robot assembly 2, which includes a robotic arm 3 having remotely controlled articulated joints 4 is employed, which avoids the need for an astronaut to under-take a space-walk. The structural framework X may include one or more rails 5 for guiding movement of the robot 2 to the antenna module I. Also, a head 6 of an additive manufacturing apparatus 7 or 3D printer device is mounted at an end region of the robotic arm 3. In this way, the method described above with reference to FIGS. 1-3 can be performed with the robot assembly 2 on the space-station T to generate and install a new element or fixture 1 to repair the antenna module I. In the event that no rails 5 are available for the robot 2 on the structural framework X, it will be noted that the head 6 of the additive manufacturing apparatus 7 may also be used to generate and install rail members 5 on the framework X of the space-station T according to the method of the invention for guiding the robot assembly 2 to that part of the antenna module I to be repaired.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The invention claimed is:

1. A method of installing a fixture in or on a body or fuselage structure of an aircraft or spacecraft, comprising:
    providing a reference marker in or on the body or fuselage structure;
    generating a three-dimensional digital model of the fixture, the three dimensional digital model including data concerning a predetermined position of the fixture in or on the body or fuselage structure;
    detecting and identifying, by a robot assembly, the reference marker;
    arranging a head of an additive manufacturing apparatus associated with the robot assembly in the fuselage structure to a correct position relative to the reference marker; and
    forming the fixture in situ on the fuselage structure with the head of the apparatus based on the digital model of the fixture,
    wherein the fixture is installed on the fuselage structure by connecting the fixture to the fuselage structure as the fixture is formed.

2. The method according to claim 1, wherein forming the fixture in situ comprises building the fixture sequentially, wherein layers of the fixture are sequentially deposited on the fuselage structure.

3. The method according to claim 2, wherein building the fixture sequentially comprises generating and building up layers of the fixture in the fuselage structure with the head of the apparatus.

4. The method according to claim 1, wherein connecting the fixture to the fuselage structure includes at least one of:
bonding or fusing one or more of layers of the fixture to the fuselage structure as they are generated; and
forming the fixture in situ in a mechanical fit or a mechanical engagement with part of the structure.

5. The method according to claim 1,
wherein the step of forming the fixture in situ includes positioning the head of the additive manufacturing apparatus within the fuselage structure based upon the digital model.

6. The method according to claim 5, wherein the fuselage structure includes the reference markers for spatial correlation to reference points in the digital model of the fixture.

7. The method according to claim 1, wherein the fixture is formed from a polymer material or a metal.

8. The method according to claim 7, wherein the fixture is formed from a UV-curable polymer or acrylonitrile butadiene styrene or high density polyethylene.

9. The method of claim 7, wherein the metal is a eutectic metal.

10. The method according to claim 1, wherein the additive manufacturing apparatus is configured for any one or more of: fused deposition modelling, laser sintering, selective heat sintering, or stereo-lithography.

* * * * *